Dec. 7, 1965 W. G. CAMPBELL ETAL 3,221,556
BATHYTHERMOGRAPH SYSTEM
Filed Jan. 31, 1964 7 Sheets-Sheet 4

INVENTORS
WALTER G. CAMPBELL
WILLIAM VAN ALAN CLARK, JR.
COURTLAND B. CONVERSE
BY Nolte & Nolte
ATTORNEYS

INVENTORS
WALTER G. CAMPBELL
WILLIAM VAN ALAN CLARK, JR.
COURTLAND B. CONVERSE
BY Nolte & Nolte
ATTORNEYS INVENTORS
WALTER G. CAMPBELL
WILLIAM VAN ALAN CLARK, JR.
COURTLAND B. CONVERSE
BY Nolte & Nolte
ATTORNEYS

United States Patent Office 3,221,556
Patented Dec. 7, 1965

3,221,556
BATHYTHERMOGRAPH SYSTEM
Walter Graham Campbell, William Van Alan Clark, Jr., and Courtland B. Converse, Marion, Mass., assignors to Buzzards Corporation, Marion, Mass., a corporation of Massachusetts
Filed Jan. 31, 1964, Ser. No. 342,338
21 Claims. (Cl. 73—362)

This application is a continuation-in-part of application Serial No. 256,649, filed on February 6, 1963 and now abandoned.

This invention relates to apparatus for measuring various properties of the ocean or a body of water with respect to depth.

In large bodies of water, properties such as temperature, salinity, etc., change considerably with respect to depth. There are many reasons why it is desirable to detect and record these properties at different points in the ocean. For example, the variation of temperature or the existence of low depth liquid layers at a specific temperature can seriously affect the properties of acoustical energy as it is propagated through the water. Such changes deleteriously affect the performance of sonor devices such as weapons systems and commercial devices used, for example, for fish detecting purposes.

Various devices and methods have been proposed for the collection of the data necessary to accurately determine ocean properties such as temperature and salinity over a wide range of depths. Heretofore, the proposed systems have lacked accuracy and reduction of the collected data has been time consuming and nonautomatic. In addition, the present systems have been useful over only limited depth ranges, while requiring a reduction in the speed of the launching ship during the measuring periods.

Accordingly, the main object of the present invention is to provide an aquatic measuring device which avoids all of the above-mentioned drawbacks.

A more specific object is to provide a more accurate aquatic measuring device having a greater depth range for use with ships underway at higher speed and higher sea states, while maintaining flexibility of ship maneuvers.

Another object of the invention is to provide an improved aquatic probe for testing various properties of water as a function of depth.

It is also an object of the invention to provide an improved aquatic measuring system wherein free falling vertical descent of a probe is insured regardless of the horizontal movement of the transporting vehicle.

Still another object is to provide an aquatic measuring system capable of rapidly and accurately manifesting the value of a specific property of the ocean as a function of depth.

Yet another object is to provide an aquatic measuring system including means for compensating for errors in depth measurement introduced by temperature variations at different depths.

Another object of the invention is to provide a bathythermograph in which the received data is quickly reproduced and may be easily read back.

It is still another object of the invention to provide a bathythermograph in which the readout may be easily calibrated as a measurement of sound velocity versus depth.

Yet another object is to provide a bathythermograph in which all of the components are relatively portable and may be easily installed on board ship.

It is also an object of the invention to provide an aquatic measuring system which is simple and reliable.

According to the invention, the above objects are accomplished by the use of an aquatic probe which contains a particular sensing device and which may be deployed from a ship or the like. The probe returns electrical signals, indicative of the particular property being measured, to the ship via wire which uncoils from both the probe and the ship to minimize the effect of wire deployment on the vertical descent of the probe.

In a preferred embodiment of the invention, the shipboard apparatus includes means for recording the signals returned by the probe as a function of depth by correlating the depth of the probe to the probe's constant rate of descent. For the sake of accuracy, a signal may be given the instant the probe hits the water to move a recording medium at a fixed rate accurately related to the probe's rate of descent. The property sensing means of the probe may be connected in a bridge arrangement, with an additional wire added to the probe and coupled to the sensing means and bridge in such a manner as to cancel out the effects of the resistance changes in the signal transmitting wire due to temperature variations as the depth increases.

The manner in which the above and other objects of the invention are accomplished will be described in further detail below with reference to the following drawings, wherein.

The present invention will be described relative to a bathytheromograph or temperature sensing device, but it is to be understood that the principles of the present invention are equally applicable to devices which measure any property of a body of water as a function of depth.

Figure 1:
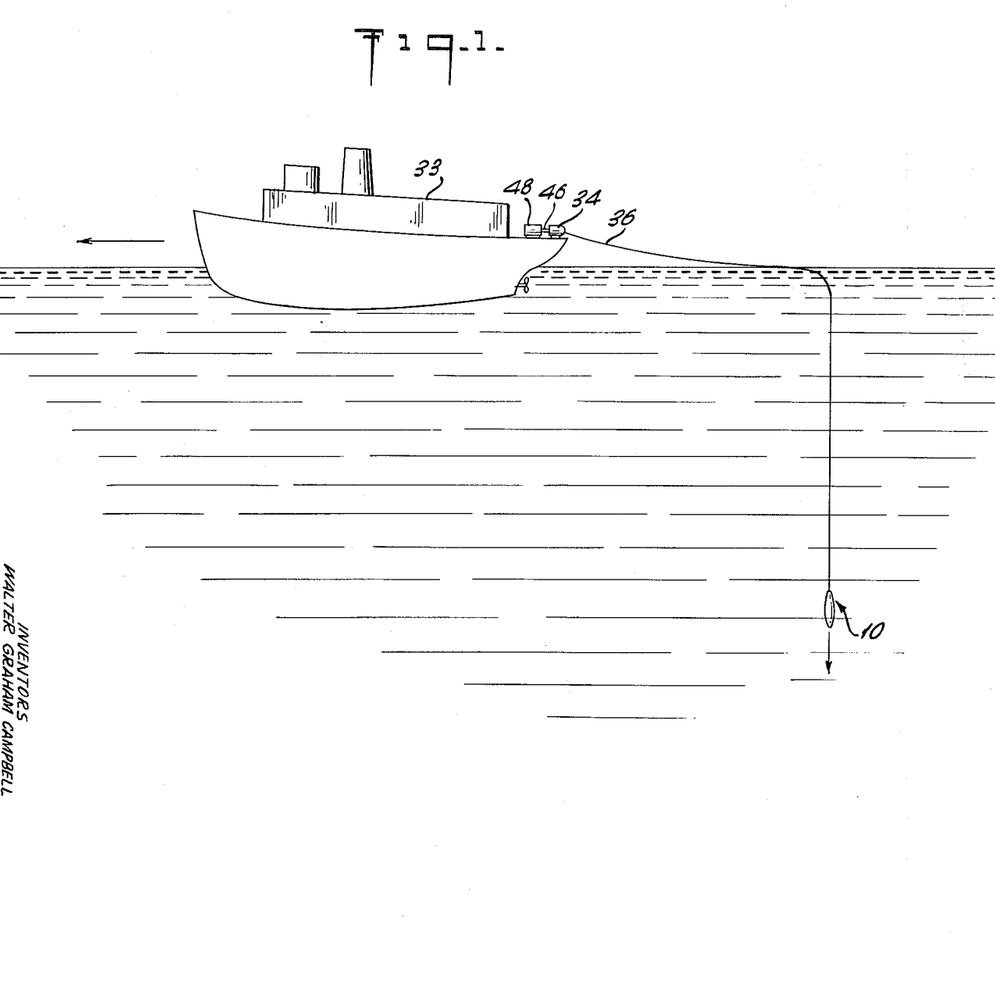
FIG. 1 is a drawing of an expandable ballistic bathythermometer in use according to the invention.

As shown in FIG. 1, the invention includes an expendable probe 10 which is deployed from a moving ship containing the electronic apparatus to which probe 10 is electrically coupled via wire 36. As will become more apparent hereinbelow, a fundamental feature of the invention is the fact that the wire is deployed in both horizontal and vertical directions to thus minimize the effect of wire deployment on the probe's descent.

Figure 2:
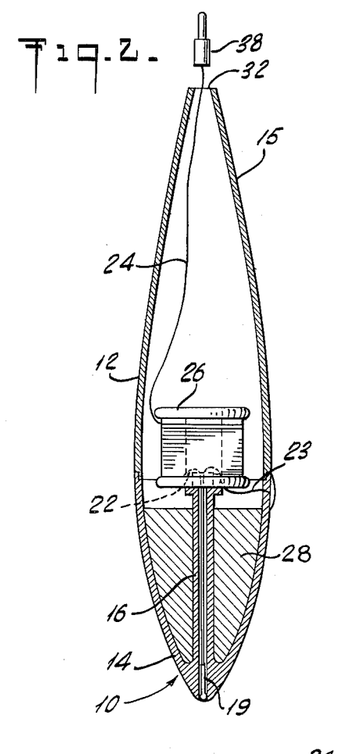
FIG. 2 is a cross sectional view of the bathythermometer of FIG. 1.
Figure 3:
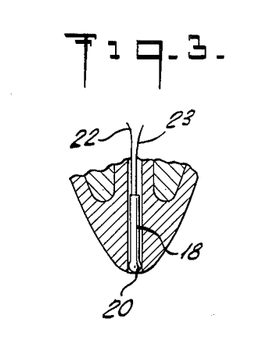
FIG. 3 is an exploded view of a portion of the bathythermometer of FIG. 2.

As can be seen more clearly from FIG. 2, the bathythermometer 10 includes a housing 12, and a nose portion 14 which combine into a teardrop shape having a smooth, rounded, forward end extending rearwardly to a relatively small pointed rear portion 15. Mounted within the housing, and centrally positioned therein is a tube 16 integrally formed with the housing. A thermistor element 18 is positioned in the forward portion 14 of the housing within the cavity 19 formed by tube 16, to allow exposure of the thermistor to the ambient liquid. Electrically connected to thermistor 18 are wire leads 22 and 23. Leads 22 and 23 extend through tube 16, to cable 24 which is coiled upon cable spool assembly 26. Assembly 26 is mounted upon tube 16 by suitable means (not shown). Mounted concentrically about tube 16 in a symmetrical manner is a weight 28 which may consist of any suitable material such as lead to provide the bathythermometer with sufficient weight to move the unit down through the liquid at the desired rate of descent.

In the single wire system illustrated in FIG. 2, wire 23 leading from thermistor 18 is electrically connected to the conductive housing 12, while lead 22 is connected to the innermost end of the cable 24 coiled about the spool 26. Thus, the ocean in this embodiment is utilized as the return signal path for the system. In the rear portion 15 of housing 12 there is located an opening 32 which serves to allow the exit of cable 24 therethrough.

As will be explained below, in preferred embodiments, the invention utilizes one or two wire measuring systems in which the sea itself serves as a return path. However, the probe can be utilized with any number of wires and could readily be used, for example, in a three wire system with no sea return path.

Figure 4:
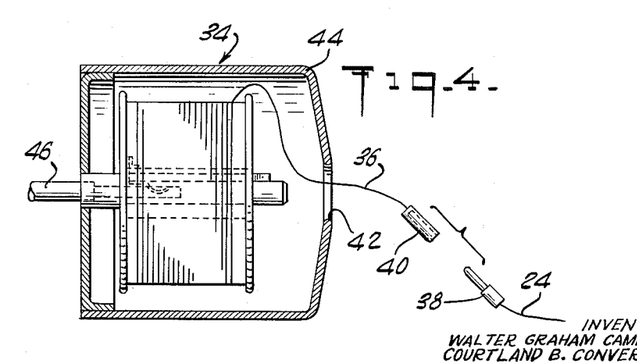
FIG. 4 is an exposed view of the cable spool mounted on the ship of FIG. 1.

Cable 24 is payed out through the rear of housing 12 to the spool on the signal-receiving vehicle 33, as shown in FIG. 1. Cable 24 is connected to cable 36 which is mounted upon spool assembly 34 as shown more clearly in FIG. 4. A male connector 38 is secured to the end of cable 24 and female connector 40 is secured to the end of cable 36, thereby providing for the connection of the two cables. Lead 22, extending through cable 24 is electrically connected to male connector 38. Thus the electrical connection with the thermistor extends to cable 36 through insulating cable 24. Cable 36 is payed out through opening 42 in housing 44 of cable spool assembly 34. The inner end of cable 36 is connected through conduit 46 to suitable electronic receiving equipment 48 which interprets the signals received from the sensing elements.

The embodiment described hereinabove relates to a temperature measuring device; however, it should be understood that a system as described may be utilized to measure the pressure, salinity, speed of sound, light conductivity, density, etc. of the ambient liquid. Thus, the aquatic device described herein may be employed in a variety of liquid property measuring capacities.

In the present invention a system is described which provides for the continuous measurement of the temperature of the ambient liquid relative to its depth. The operation of the system can best be understood with reference to FIG. 1.

The cable spool assembly 34, positioned aboard the signal-receiving ship 33 allows cable 36 to be freely payed out to thereby provide for the horizontal motion of the ship. Cable 24 stored within housing 12 upon spool assembly 26 is freely payed out through opening 32 to thereby provide for the vertical motion of the bathythermometer. It can be readily understood that by positioning a cable spool within the housing of the bathythermometer and another spool assembly aboard a moving ship a means is provided which allows the bathythermometer to fall freely since the cable holding the bathythermometer does not move in relation to the water in either a horizontal or vertical direction. This phenomenon is effected because the unwinding of the cable from spool 34, located aboard the ship compensates for any horizontal motion of the cable with respect to the water and the cable being payed out of the bathythermometer eliminates any vertical motion of the cable with respect to the water. Thus the cable represented by the line in FIG. 1 does not move with respect to the water in either a vertical or a horizontal direction.

In the present invention the system parameters involved are the continuous measurement of temperature with depth. Thus as the bathythermometer falls through the liquid the temperature of the liquid changes with the change in depth. These changes in temperature are sensed by the change in the resistance of the thermistor contained in the temperature probe exposed to the ambient liquid. The signals representing the resistance values sensed by the thermistor are transmitted through cables 24 and 36 of the conduit 46 to the shipboard receiving equipment 48. It is essential, therefore, in the context of the present invention that the depth of the liquid through which the temperature probe is passing at any particular instant be accurately known. The rate of descent of the missile may be determined empirically to thereby allow the depth of the bathythermometer at any particular instant to be calibrated through the utilization of a time-scale recording. Thus, the temperature of the liquid at a particular depth may be accurately determined.

From the foregoing it may be understood that any horizontal or vertical movement of the cable relative to the water would seriously impair the accurate determination of the depth of the temperature probe because the velocity of the missile would vary due to the unpredictable frictional resistance of the cable caused by any movement of the cable relative to the water. Since, as explained above the present invention provides a relatively stationary cable which does not add any significant friction to the system, this problem has been obviated. Thus, reducing the friction of the system to a minimum and providing a truly free-falling temperature probe is a primary concern of the invention. The application of this concept results in a freely falling body whose velocity is not affected by the cable attached to it since the cable is not dragged through the water but as a result of being payed out by the missile and by the receiving vehicle remains stationary with respect to the water.

In the event that the present invention is to be utilized by deploying it from a stationary carrier such as a dock or a stationary ship the second play out spool 34 will not be necessary. Thus the end of the cable 24 may be attached directly to the receiving equipment and the temperature probe dropped straight down into the water. The play-out spool 26 located within the housing 12 of the bathythermometer will again provide for a freely falling object. Cable 24, therefore, will not offer any resistance to the water because it will remain stationary relative to the water, thereby providing for a more linear and predictable rate of fall for the temperature probe.

It should be noted that by designing the temperature probe for positive rather than negative buoyancy the system may be adapted to work in reverse. Thus the temperature probe could be released from a submerged location, for example from a submarine, and the temperature probe will rise vertically up through the water with the cable 24 being payed out through the rear of the probe.

A significant feature of the invention resides in the system which utilizes the information gathered by the expendable probe to enable production of a permanent record showing temperature as a function of depth. Various problems arise because of the fact that the missile deploys a great length of wire during its descent. Thus, if the ship is moving at a high rate of speed it is desirable that the vertical descent of the probe be as rapid as possible to minimize the length of wire deployed for the sake of accuracy as well as for economic reasons. For example, if copper wire is selected, the effect of the temperature co-efficient of resistivity is significant over the range of temperatures encountered by the probe during its descent. Thus, the errors introduced by the varying resistance of the copper wire as the temperature of the water changes, might normally appear as changes in the thermistor resistance, which would introduce errors into the measuring circuits. FIGURES 5 to 9 illustrate an embodiment of the invention in which this serious drawback is avoided.

Figure 5:
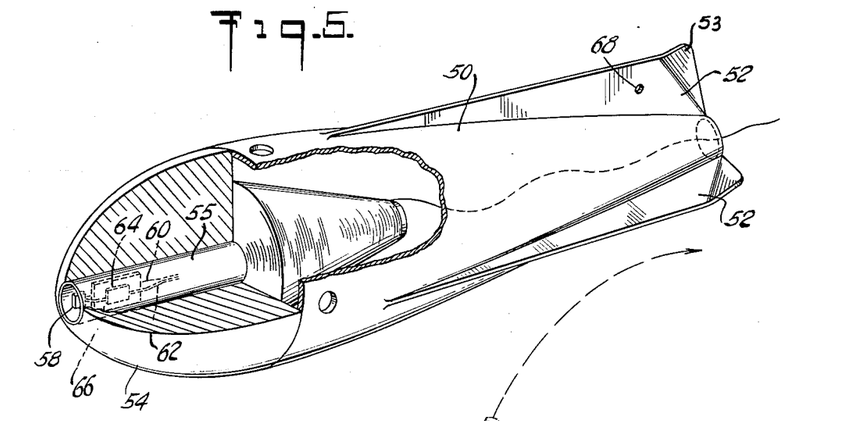
FIG. 5 is a perspective view of an aquatic probe according to another embodiment of the invention.

In this embodiment, the probe consists of a rear, coneshaped member 50 including three stabilizing fins 52 and a forward bullet shaped lead weight 54. The rate of descent of the probe is controlled by its manufactured weight and close dimension. Small manufacturing errors cause asymmetrical pressure gradients which in turn result in a path of descent which is not vertical. Compensation for this error is achieved by offsetting the end portions 53 of fins 52 to cause the probe to rotate about its vertical axis. Lead weight 54 includes a central bore in which an elongated tubular sea return electrode 55 is disposed. The thermistor 58 is physically located at the forward end of electrode 55. An important feature of this embodiment is the use of two wires 60 and 62 electrically connected to opposite ends of thermistor 58 and physically supported in a suitable manner on an insulation pad 64 mounted in a planar member 66. The wires 60 and 62 are coiled around the end of tubular electrode 55 which extends rearwardly from lead weight 54. Unlike the embodiment of FIGURE 2, the spool contains no rear retaining plate, and instead, the two wires are coiled in a conical form as a spinning type spool to facilitate deployment of the line during descent of the probe. One of the two wires, for example wire 60 is electrically connected to the sea return electrode 55 for reasons which will become more apparent hereinbelow.

Figure 6:
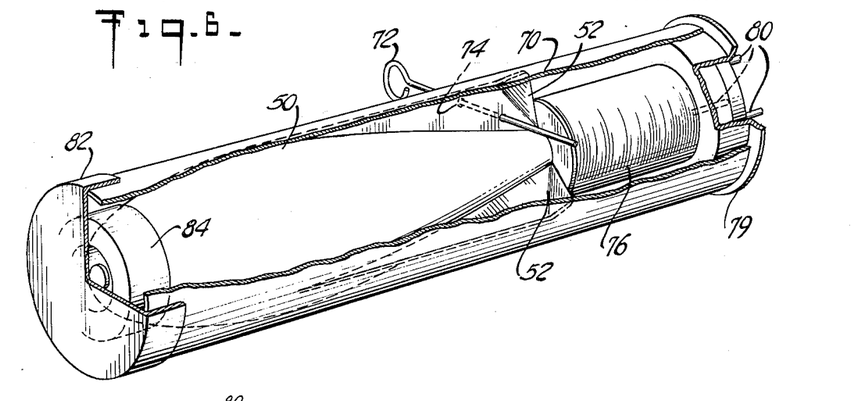
FIG. 6 is a perspective view of the aquatic probe of FIG. 5 mounted in its shipping canister.

One of the fins 52 includes an aperture 68. The probe may be stored in a container 70 which includes an aperture 74 so that a lanyard pin or launching pin 72 may be inserted through apertures 74 and 68 to secure the probe until deployment. The probe is positioned immediately in front of a stationary wire coil 76 wound around a spinning type spool 78, which includes a rearwardly extending radial flange 79 to engage the end of container 70. A plurality of connector pins 80 are used to couple the entire assembly to the shipboard electronic equipment. The forward extremity of container 70 is closed by means of a cap 82 and includes a rubber bumper 84 to protect the probe prior to its use.

Figure 7:
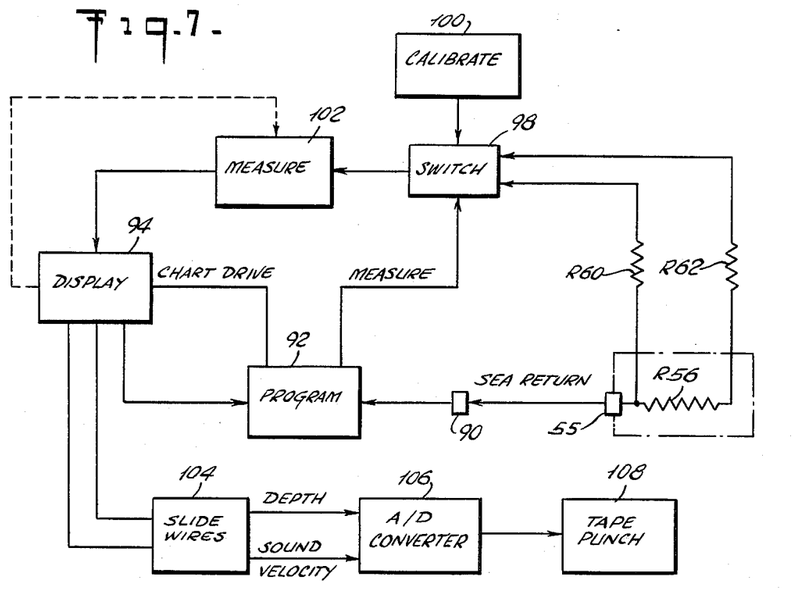
FIG. 7 is a block diagram of the electronic measuring and recording system.

FIGURE 7 is a block diagram of a two wire system which compensates for resistance changes due to temperature excursions, while providing a continuous analog and/ or digital representation of ocean temperature as a function of depth. In FIGURE 7, the resistance of thermistor 58 is illustrated schematically as R56, and the resistances of wires 60 and 62 illustrated as R60 and R62, respectively. Electrodes 55 is coupled to a shipboard electrode 90 through an electrical return path through the ocean or body of water itself. The impedance of the seat return path is substantially independent of depth, but because of temperature changes may vary from between twenty and fifty ohms in the practical ranges envisioned. It will be shown that this variation has no material effect on the actual measuring circuits.

Shipboard electrode 90 is coupled to a programming circuit 92 which automatically controls the system operation. Thus, when the probe is deployed into the water, a signal is detected by shipboard electrode 90 through the sea return path to energize a display 94, which, in a preferred embodiment, may be a conventional strip chart recorder. Hence, effectively, programmer 92 starts the recorders of display 94 when the probe hits the water. At the same time, a control signal is applied to a switching circuit 98 to which thermistor R56 is coupled via the uncoiling wires 60 and 62 which are being deployed in both horizontal and vertical directions as explained above.

A calibrating circuit 100 may be normally coupled through switch 98 to the measuring device 102 to calibrate the recorder prior to the actual measuring step. Programmer 92, when actuated, operates switching circuit 98 to disconnect the calibrating circuits 100 and connect wires 60 and 62 (and thermistor R56) to the measuring circuit 102. The output of measuring circuit 102 is an analog voltage which is coupled to display 94. An important feature of the invention is the fact that the recorder of display unit 94 is driven at a rate of speed accurately related to the substantially constant rate of descent of the probe, so that when the analog of the return voltage is recorded on a properly graduated scale the resultant graph represents the temperature of the ocean as a function of its depth. Another feature of the invention is the provision of a mechanical feedback loop between display 94 and measuring circuits 102 to linearize the output of the recorder with respect to temperature, and also to compensate the gain characteristics of the system so that the effects of the variation in the thermistor resistor change per degree centigrade over the temperature range encountered may be minimized. The above features are more fully explained with respect to FIGURES 8 and 9 below.

The invention also contemplates the direct recording of other properties of the water. For example, the precise velocity of sound at various depths of the ocean is of critical importance in sonar systems. Thus, depth and temperature information from display 94 may be coupled to conventional slide wires on recorder 104 which produce two outputs indicative of depth and sound velocity. These outputs may be utilized directly, or instead, coupled to an analog to digital converter 106 which feeds the information to a tape punch 108 to record the data in digital form.

It has already been mentioned that a two wire system is used to compensate for resistance changes in the wire due to temperature differentials. For practical purposes, it may be assumed that the probe will encounter temperatures ranging from thirty to minus two degrees centigrade. Because of this wide temperature excursion, the significant change in resistance of the deployed wire would normally be confused with the thermistor changes of resistance, producing considerable errors. Also of importance is the fact that the gain characteristics of the system will vary due to the variation in the thermistor rate of change of resistance with respect to temperature. This rate may vary by as much as a factor of five over the temperature range encountered.

Figure 8:
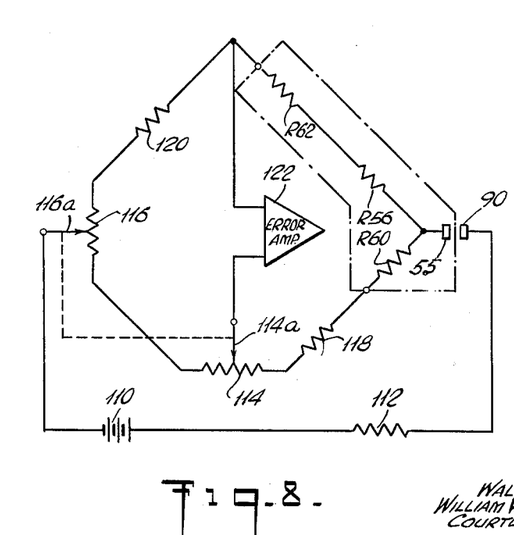
FIG. 8 is a schematic illustration of the measuring bridge of the invention.

A basic measuring circuit used to linearize the recorder output with respect to temperature by compensating for the above effects is illustrated in FIGURE 8. The circuit is basically a Wheatstone bridge and includes a source of voltage 110 which is connected to a relatively high resistance 112 in series with the sea return path between electrodes 55 and 90, electrode 90 being connected to one junction of the bridge. Resistor 112 should have a relatively high resistance to minimize the relatively slight changes in resistance of the sea return path at different temperatures.

One leg of the bridge comprises the thermistor 58 and copper wide 62 the impedances of which are illustrated at R56 and R62 respectively. The leg which balances that leg includes copper wire 60, shown as R60, which compensates for the changes in resistance of wire 62 since both wires are subjected to the identical temperatures and thus the same resistance changes. As noted, the junction of thermistor R56 and wire 60 is coupled to the sea electrode 55 of the probe which is in series with the sea return path and battery 110.

The rest of the bridge or measuring circuit is located in the electronic equipment aboard the ship. The bridge includes variable resistors 114 and 116 having slidable taps 114a and 116a, respectively. A fixed resistance 118 is connected in series with wire 60 and one end of resistance 114. A second fixed resistance 120 is coupled between the ends of wire 62 and variable resistor 116. The output of the bridge is taken from the junction of resistor 120 and wire 62 and sildable tap 114a, and fed to error amplifier 122, which, in a known manner, is coupled to a servo mechanism (not shown) to record a visible trace of the temperature on the moving chart.

The value of resistor 118 is equal to the minimum thermistor resistance, which is the thermistor resistance at thirty degrees centigrade. The value of resistor 114 is equal to the maximum thermistor resistor (i.e. the thermistor resistance at minus two degrees centigrade) less the minimum thermistor resistance. Resistors 116 and 120 are both equal to one half the value of resistor 114. Slidable taps 114a and 116a are mechanically linked together and have the same shaped curve of resistance versus position. The two taps may be driven in a conventional manner by the servo which controls the recording apparatus so that they are positioned in accordance with the resistance value of thermistor 58.

At any condition of bridge balance, the resistance between tap 114a and the junction of resistors 114 and 118 is equal to the measured thermistor resistance minus the minimum thermistor resistance, while the resistance between tap 116a and the junction of resistors 116 and 114 will be equal to one-half the difference between the measured thermistor resistance and the minimum thermistor resistance. It can therefore be shown that the resistance of the bridge arm between tap 114a and 116a is equal to the resistance of the arm between tap 116a and the junction of resistor 120 and wire 62. Similarly, the resistance of the arm including the wire 62 and thermistor 58 is equal to the resistance of the bridge arm between the junction of thermistor 58 and wire 60 and tap 114a. Hence, it can be shown that for a bridge unbalance due to a change in thermistor resistance, the output of the bridge per degree centigrade varies by a much lower factor (i.e. a factor of "two") over the contemplated temperature range despite the five to one variation in the change of thermistor resistance with respect to temperature over this range. Additionally, variation in the source impedance of the bridge may provide additional gain compensation since it increases with the increase in the thermistor rate of resistance change.

Figure 9:
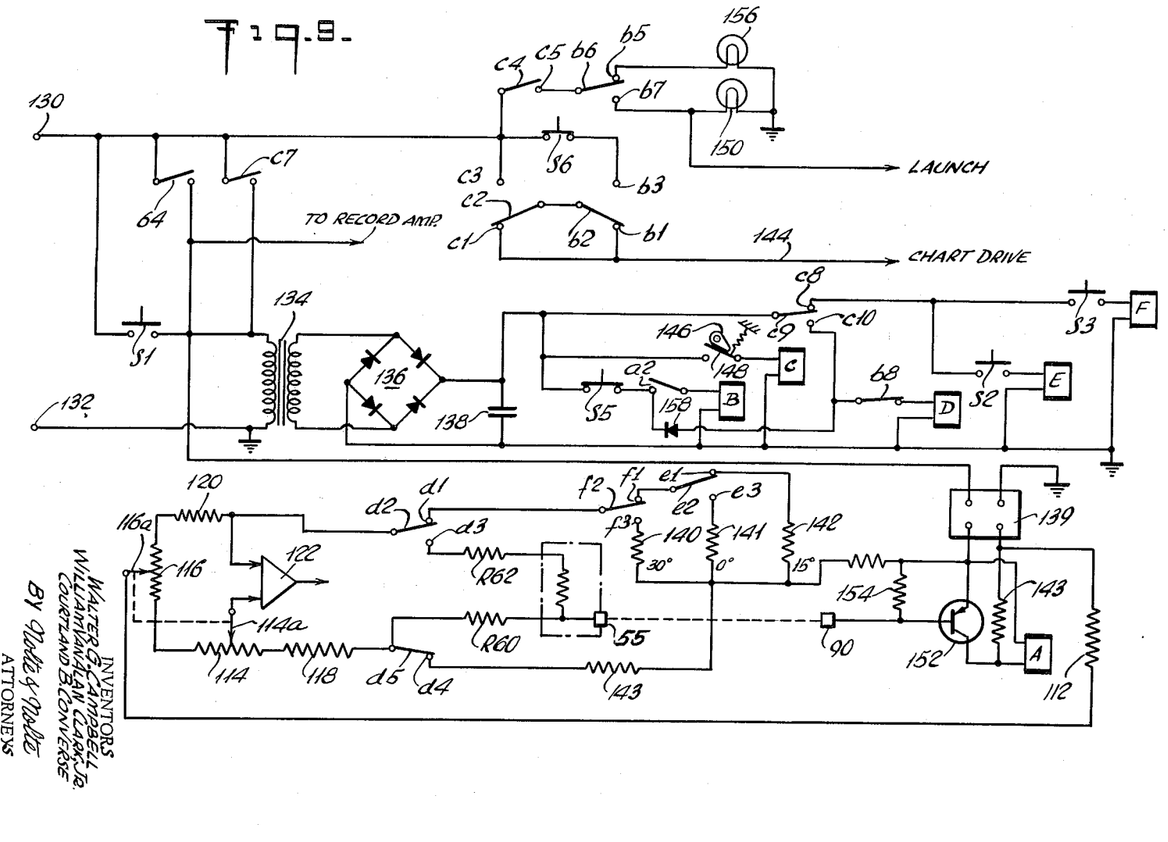
FIG. 9 is a circuit diagram of a portion of the electronic apparatus illustrated in block form in FIG. 7.

FIGURE 9 is a schematic diagram of the programming circuits illustrated in block diagram form in FIGURE 7. FIGURE 9 also includes the measuring bridge, explained with reference to FIGURE 8, identical numerals being used to identify the same components. The circuits illustrated in FIGURE 9 are located aboard ship with the exception of thermistor resistance R56 which, of course, is within the probe, and wires 60 and 62 which are deployed between the boat and probe, the resistances of which are indicated as lumped parameters at R60 and R62, respectively.

The programming circuitry is a relay control including six relays A, B, C, D, E, and F. For purposes of description, the movable and stationary contacts of each relay will be identified by the lower case letter corresponding to the energizing relay together with respective callout numerals. Thus, contacts a1, a2, etc., are the relay contacts responsive to operation of relay A.

Other than the circuits illustrated in FIGURES 8 and 9, the components shown in FIGURE 7 are conventional and well known in the art. Accordingly, further discussion of those elements will not be included herein. The circuit shown in FIGURE 9 is the schematic diagram of those circuits corresponding to programmer 92 switch 98, calibrating circuit 100, and measuring circuit 102.

The circuit includes a pair of terminals 130 and 132 adapted to be connected to an alternating source of current. A push-button switch S1 couples the alternating potential to a transformer 134, the secondary of which is coupled to full wave rectifier 136 and smoothing capacitor 138 to provide the relay power supply. Closure of switch S1 also couples the alternating potential to a second conventional power supply 139 whose output is a regulated voltage of, for example, seventy-five volts for measuring and calibrating purposes.

The calibrating circuits include three resistors 140, 141, and 142 corresponding to thirty degrees centigrade, zero degrees centigrade and fifteen degrees centigrade, respectively. Resistor 142 is normally connected in the measuring arm of the bridge via relay armatures e2, f2, and d2, and through resistor 143 and contact d5. After the power supply 139 is activated, the measuring circuit is completed through resistor 112 and tap 116a, the other side of the power supply being connected to the common terminal of the calibrating resistors.

When power supply 139 is activated, its output voltage is also applied across relay A through resistor 143 to operate this relay. When relay A is operated, its armature a1 contacts terminal a2 which connects the output of relay supply 136 across relay B. Energization of relay B applies the alternating potential on terminal 130 through contact b3, armature b2 and the normally closed contacts of relay C to line 144 which drives the chart of the strip recorder. Contact b4 closes to apply the operating voltage to the recorder amplifier, and since the resistor 142 is connected in the measuring circuit, the recorder may be calibrated during this period with the known fifteen degree resistance in the circuit.

To provide automatic operation of the programmer, a cam 146 may be added to the recorder so that it rotates one revolution per record. For example, cam 146 may rotate one revolution for each twelve inches of chart travel. The cam operates to stop the chart drive and to indicate that the system is ready for the launching operation. After the launching initiates a recording sequence, the cam stops the chart drive at the end of the measurement cycle. The chart must be aligned with respect to the cam position when it is installed in the recorder in a manner which will be obvious to those skilled in the art.

At the proper reference point, cam 146 rotates and closes a switch 148 which energizes relay C via the relay power supply. When relay C is energized armature c2 contacts terminal c3 removing the potential at terminal 130 from line 144 to the chart drive, thus stopping the recorder. Simultaneously, armature c4 contacts c5 and applies the A.C. potential through armature b6 and contact b7 to launch the probes into the water in a manner to be described below. Closure of contact b7 also applies a potential to indicating light 150 showing that the launching operation is about to proceed. Contact c7 holds the A.C. potential across the two power supplies. Armature c9 switches to terminal c10 in the energizing circuit of relay D, but this relay is not energized because contact b8 is opened since relay B is energized.

The launch signal causes the probe to be deployed into the water and as soon as the probe strikes the water, the sea return path is closed between sea electrode 55 of the probe and electrode 90 of the ship. A normally non-conducting transistor 152 has its emitter and collector connected directly across the coil of relay A. A resistor 154 is connected in the base emitter circuit of transistor 152 so that when current is drawn through the sea return path, the current flow in resistor 154 biases the transistor into conduction. Conduction of transistor 152 short circuits the terminals of relay A de-energizing the relay and returning the contacts to their normal position. Thus, when armature a1 opens, the energizing source of relay B is removed and this relay is also released.

When contact b2 returns to terminal b1, the alternating voltage on terminal 130 is applied through contacts c3, c2, b2, and b1 to line 144 and the chart drive control to reinitiate movement of the recorder. At the same time, contacts d2 and d5 open, terminals d1 and d4, respectively, to disconnect calibrating resistor 142 from the measuring circuit, and couple the circuit including wires 60 and 62 and thermistor 56 into the measuring bridge as discussed above.

The calibrating circuit also includes a resistor 143 to compensate for the resistance of the second wire since the resistance of each of the calibrating resistances 140, 141, and 142 is equal to the resistance of the thermistor at the particular temperature to be calibrated plus the resistance of the wire.

Relay C remains energized by the closure of switch 148 due to cam 146 so that when release of relay B returns armature b6 to contact b5, terminal 130 is connected through c4, c5 and b6, b5 to a "measure" indicating light 156. Although contact b4 is opened, contact c7 maintains the A.C. supply to the respective power supplies.

As the probe falls, the changing resistance R56 is measured in accordance with the description of FIGURE 5, with the direct voltage being supplied by supply 139 through resistor 112 and the sea return path between electrodes 55 and 90. The output of amplifier 122 is coupled to the recorder which visibly prints an indication of temperature versus depth as determined by the constant descent of the probe.

At the end of the cycle, cam 146 permits switch 148 to open, releasing relay C and removing the A.C. from the power supplies, thus de-energizing all the components of the circuit.

During the automatic operation of the programmer as above described, the calibration process uses only the fifteen degree resistor 142. However, prior to the generation of the "launch" signal, resistors 140 and 141 may be alternatively connected into the calibrating circuit by means of switches S2 or S3 respectively. Thus, switch S2 energizes relay E which causes its armature e2 to contact terminal e3 connecting the zero degree resistor 141 in the measuring branch of the circuit. Similarly, switch S3 energizes relay F connecting resistor 140 through terminal f3 and armature f2 in the measuring circuit. When cam 146 initiates the launch sequence of the operation by energization of relay C, the opening of contacts c8 and c9 prevents operation of relays E and F. Opening of switch S5 prior to the launch sequence, (i.e. operation of relay C) releases relay B which deactivates the power supply and prevents operation of the system. Once relay C has been energized, relay B is held operated (until relay A is released) through a holding circuit including armatures c9, terminal c10, diode 158, and closed contact a1. Opening of switch S6 will prevent a chart drive signal on line 144 during the initial warm-up and calibration period.

Figures 10, 11:
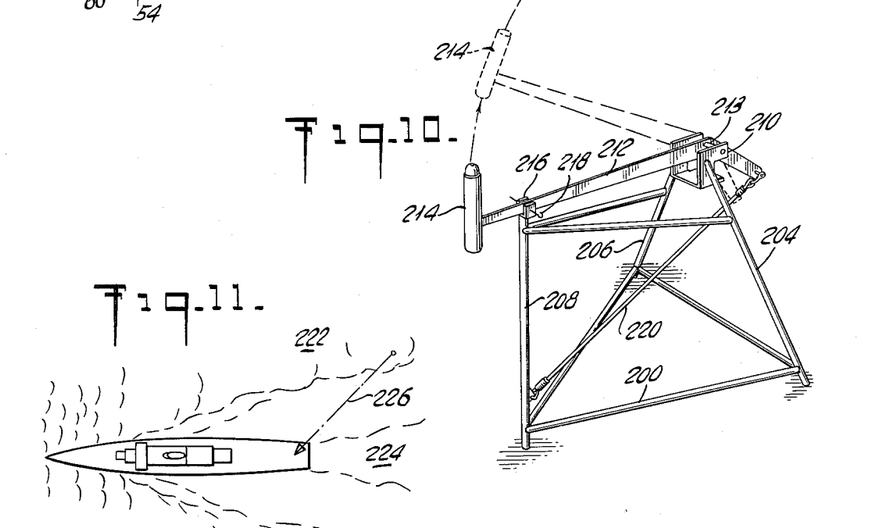
FIG. 10 is a perspective view of a catapult apparatus for launching the aquatic probe of the invention.
FIGS. 11 and 11A are diagrammatic illustrations of the manner in which the catapult of FIG. 10 launches the probe into the water.

FIG. 10 illustrates a catapult launching system for the invention which is particularly useful for launching the probe from the aft portion of the ship. The catapult comprises a triangular base 200 from which three upwardly extending struts 204, 206 and 208 extend. At the upper intersection of struts 204 and 206 a U-shaped yoke 210 is secured. A catapult arm 212 is rotatably supported in yoke 210 by means of a pin 213 suitably journalled in the upstanding legs of the yoke. A cylindrical container 214, adapted to hold the probe, is mounted at the other end of arm 212. Arm 212 is secured in a U-shaped bracket 216 at the top of strut 208 by means of a pin 218 passing through suitable apertures in the bracket and arm.

A conventional elastic arm 220 under tension is secured between the free end of arm 212 and the lower portion of vertical strut 208, so that when pin 218 is removed from bracket 216, arm 212 is free to rotate rapidly in a clockwise direction to thus launch the probe into the water at a position free of the propeller and back wash of the ship.

Figure 11A:
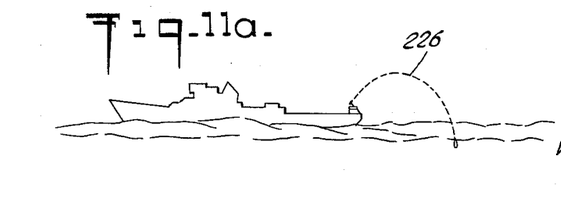

As shown in FIGS. 11 and 11a, the trajectory 226 of the probe when catapulted is sufficient to reach the bow wave 222 insuring that the probe will not descend into the prop wash area 224.

Figure 12:
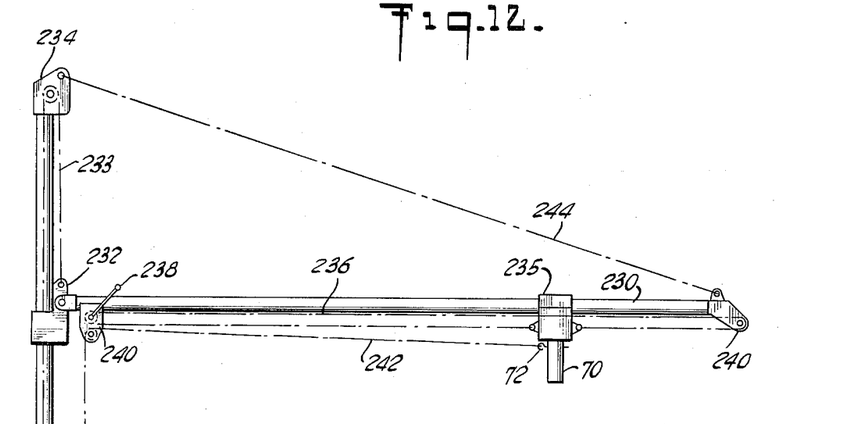
FIG. 12 is a side view of a boom launching system for the probe.

A boom launching system for deploying the probe into the water is indicated in FIG. 12. The system consists of a vertical mast 228 and a boom 230 extending transversely therefrom. Boom 230 is mounted in a carriage 232 which is movable in a vertical direction on mast 228 by means of a guide 233 and pulley 234.

Figure 13:
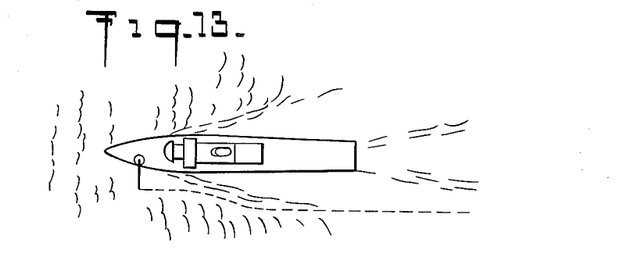
FIG. 13 is a diagrammatic illustration of the manner in which the boom launches the probe into the water.

A second carriage 235 is disposed on the boom, and carries the canister 70. Carriage 235 may be positioned along the boom by means of wire 236 secured at opposite ends to carriage 235 and rotatably mounted around pulleys 240 and 241. Thus, rotation of pulley 241 by means of a crank 238 moves the carriage to the left or right along the boom as desired. A control string 242 is coupled to the lanyard pin 72 extending through the canister 70 and probe, which, when manually pulled, will cause the probe to be deployed into the ocean. Guide line 244 is used to support the free end of the boom. The boom launching system of FIG. 12 may be used when circumstances dictate deployment of the probe from a side of the ship, in which case the probe is deployed into the water in the manner diagrammatically illustrated in FIG. 13, which is self-explanatory.

Figures 14, 15, 17:
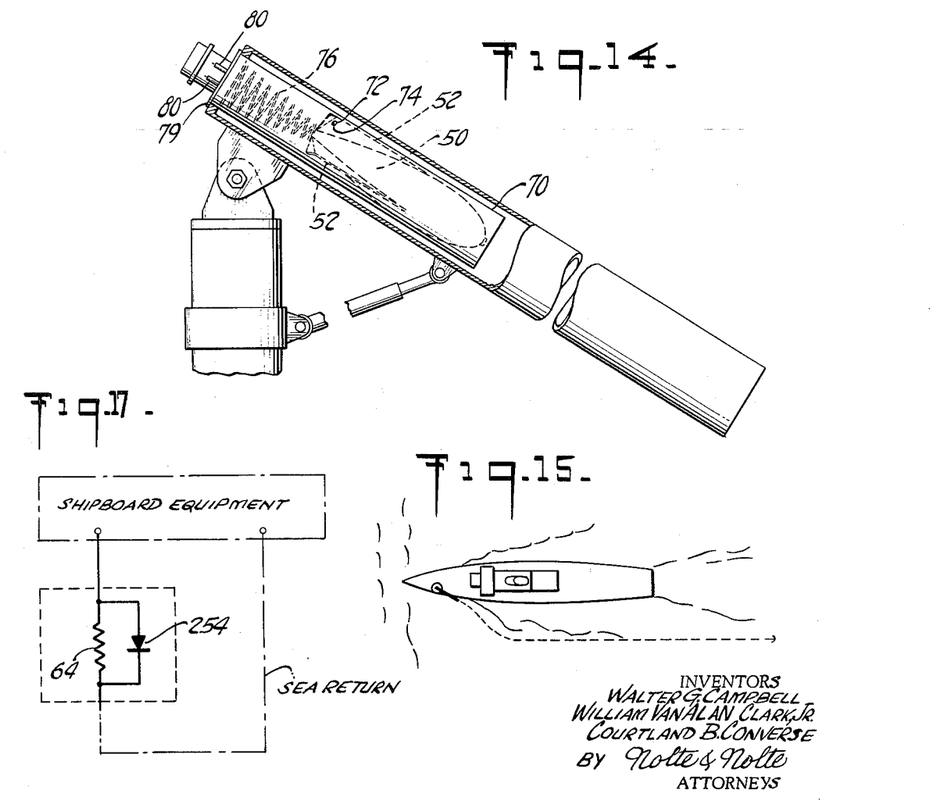
FIG. 14 is a side view partly in section of a tube launching apparatus for the probe.
FIG. 15 is a diagrammatic illustration of the manner in which the tube launcher of FIG. 14 launches the probe into the water.
FIG. 17 is a schematic diagram of single wire, sea return circuit for use with the invention.

A third launching system is shown in FIG. 14. The launching system in this case comprises a tube 244 into which the canister 70 is placed. Tube 244 is rotatably mounted on upstanding post 246 by means of a pivot member 248 in a conventional manner. When the pin 72 is removed from the canister from a point external of the tube 244, the probe is deployed into the bow wave in order to prevent the wire from entering the prop wash area as shown in FIG. 15.

Figure 16:
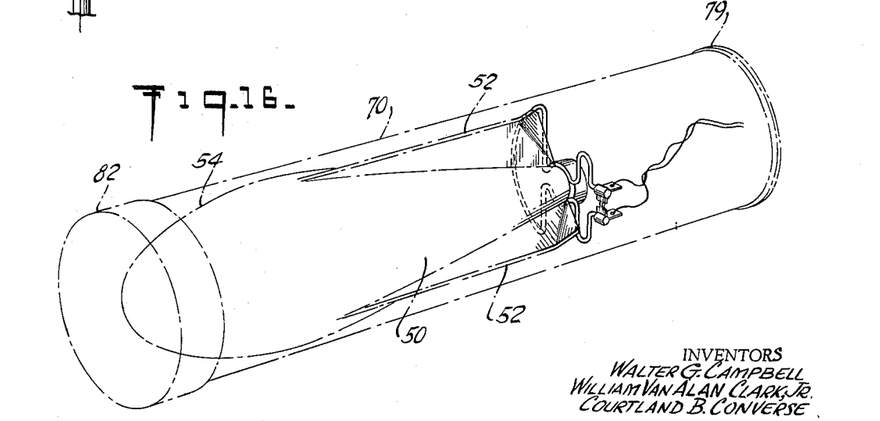
FIG. 16 is a perspective view showing another embodiment of the probe mounted in its canister.

It is not necessary that the proble be manually deployed into the water by removal of the lanyard pin 72. If desired, the program unit 92 (see FIG. 7) can produce a signal which will automatically free the probe from the canister. A system for accomplishing this is illustrated in FIG. 16, which shows a pair of wires 249, over which the launch signal is received, connected across a fuse element 250 which close a resilient member 252 to retain probe 50 within canister 70. When the launch signal is transmitted over lines 249, fuse 250 melts releasing the retainer spring 252 and enabling the probe to be deployed into the water by any of the above described methods.

If it is desired to use only a single wire, the effect of the variable transmission wire resistance due to temperature changes must be cancelled. As shown in FIG. 17, the simplest method of accomplishing this is to place a diode 254 across thermistor 64 in the probe itself while utilizing an alternating voltage for the testing purposes. In such a system, at low frequencies a noticeable capacitance occurs between the sea water and the deployed wire. However, this effect may be compensated for by the use of a square wave voltage as the bi-directional current source together with a "clamp and hold" circuit to enable measurement after the capacitor has been charged, together with selected silicon "stabistors."

Although various preferred embodiments have been shown and described, many modifications thereof will be obvious to those skilled in the art and the invention should not be limited excepted as defined in the following claims.

What is claimed is:

1. Apparatus for measuring a property of a fluid relative to a given dimension, comprising a sensor probe containing therein a quantity of wire to be deployed from said probe when the probe is traversing said dimension, recording means including a record medium connected from said wire for recording signals sent by the sensor probe relative to said property, means for moving said record medium at a rate substantially related to the rate of movement of said probe, and means for compensating for the change in the rate of movement of said probe due to the deployment of wire therefrom.

2. Apparatus according to claim 1, wherein said record medium is graduated in said dimension, and said means for compensating comprises increased distance between gradations for increasing dimensions.

3. A system for measuring the properties of water at various depths from a vehicle moving relative to the water comprising, aquatic probe means containing a sensing element for sensing a property of the water, a first conductor portion coupled to said sensing element and contained within said probe means, said probe means having an interior portion retaining said first conductor portion in wound configuration therein and having one end open for paying out said first conductor portion at a rate substantially equal to the velocity of said probe means through the water, vehicle mounted means for deploying said probe means into the water including a housing, a second conductor portion in a wound configuration within said housing coupled to said first conductor portion, said housing having one end open for paying out said second conductor portion at a rate substantially equal to the velocity of the vehicle relative to the water so that the relative motion of said first and second conductor portions with respect to the water is substantially reduced to zero, and receiving means coupled to said second conductor portion and responsive to said sensing element.

4. The system as recited in claim 3 further comprising first spool means within said interior portion upon which said first conductor portion is wound and second spool means located within said housing upon which said second conductor portion is wound.

5. The system is recited in claim 3 wherein said first conductor portion is payed out from said probe means substantially parallel to the axis of the winding of said first conductor portion.

6. The system as recited in claim 3, wherein said vehicle mounted means further includes means for launching said probe means into the water clear of said vehicle and said launching means providing support for said second conductor portion to permit said second conductor portion to be substantially freely payed out along the axis of the winding of said second conductor portion.

7. The system as recited in claim 6, wherein said means for launching said probe means includes a catapult having a pivotably mounted arm one end of which is held in tension and the other end of which is releasably coupled to said probe means, and means for releasing said arm to launch said probe means into the fluid.

8. The system as recited in claim 6, wherein said means for launching said probe means includes hollow means for containing said probe means and having an extended open end disposed clear of the vehicle, and means for retaining said probe means within said hollow means prior to deployment.

9. The system as recited in claim 8, wherein said retaining means comprises a launching pin communicative with said probe means and said hollow means for maintaining said probe means therein.

10. The system as recited in claim 3, wherein said sensing means is temperature responsive.

11. The system as recited in claim 3, wherein said probe means includes an elongated ballistic housing having a weighted nose portion and a body portion having stabilizing fins, said fins being shaped to cause rotation of said probe about an axis parallel to the direction which said probe traverses said fluid.

12. The system as recited in claim 3, wherein said probe means includes passage means extending therethrough containing said sensing element thereby permitting the water to flow freely past the sensing element.

13. The system as recited in claim 12, wherein the fluid flowing through said passage means washes past said first conductor portion to aid in paying out said conductor portion.

14. A probe for sensing the properties of fluid at varying depths comprising; a ballastically shaped hollow body open to the fluid having a nose portion and a stabilizing means extending from the after end of said body, conductor means wound to pay out in a direction parallel to the axis of the probe and mounted in said hollow body, wire guide means in the after end of said hollow body, said conductor means extending therethrough, and a sensing element coupled to said conductor means secured within said nose portion and in contact with the fluid.

15. The probe as recited in claim 14, wherein said nose portion is weighted sufficiently to cause the probe to descend through the fluid.

16. The probe as recited in claim 15, wherein said sensing element is temperature sensitive.

17. The probe as recited in claim 14, wherein said hollow body includes a plurality of holes along its circumference to permit flooding of the body portion when the probe is deployed in the fluid.

18. The probe as recited in claim 14, wherein said stabilizing means includes fins shaped to cause rotation of said probe about an axis parallel to the direction in which the probe traverses.

19. The probe as recited in claim 14, wherein said nose portion is buoyant.

20. The probe as recited in claim 14, additionally comprising means to permit said sensing element to be washed.

21. The probe as recited in claim 20, wherein said wash means comprises a passage extending through said hollow body for containing said sensing element and to guide the fluid past the sensing element as the probe traverses.

References Cited by the Examiner

UNITED STATES PATENTS

| 2,465,696 | 3/1949 | Paslay | 181—0.53 |
| 2,741,126 | 4/1956 | Anderson et al. | 73—170 |
| 3,098,993 | 7/1963 | Coop | 340—5 |
| 3,159,806 | 12/1964 | Piasecki | 340—3 |

FOREIGN PATENTS 148,259   12/1962   U.S.S.R.

DAVID SCHONBERG, *Acting Primary Examiner.*

LOUIS R. PRINCE, *Examiner.*

Notice of Adverse Decision in Interference

In Interference No. 95,688 involving Patent No. 3,221,556, W. G. Campbell, W. V. A. Clark, Jr., and C. B. Converse, BATHYTHERMOGRAPH SYSTEM, final judgment adverse to the patentees was rendered Jan. 14, 1970, as to claims 3, 5 and 10.

[*Official Gazette July 7, 1970.*]